W. E. TAYLOR.
MEASURING AND FEEDING MECHANISM.
APPLICATION FILED OCT. 23, 1911.

1,106,012.

Patented Aug. 4, 1914.

Witnesses:
Wm. Geiger

Inventor:
William E. Taylor
By Munday, Evarts Adcock & Clarke
Attys.

UNITED STATES PATENT OFFICE.

WILLIAM E. TAYLOR, OF EASTPORT, MAINE, ASSIGNOR TO AMERICAN CAN COMPANY, OF NEW YORK, N. Y., A CORPORATION OF NEW JERSEY.

MEASURING AND FEEDING MECHANISM.

1,106,012.        Specification of Letters Patent.     Patented Aug. 4, 1914.

Application filed October 23, 1911. Serial No. 656,210.

*To all whom it may concern:*

Be it known that I, WILLIAM E. TAYLOR, a citizen of the United States, residing in Eastport, in the county of Washington and State of Maine, have invented a new and useful Improvement in Measuring and Feeding Mechanism, of which the following is a specification.

This invention relates to improvements in measuring and feeding mechanism and especially to that type in which a liquid is measured and fed in equal amounts to cans as the cans are fed along a table adjacent the measuring device and more particularly to a measuring and feeding mechanism for feeding olive oil to cans filled with sardines.

In the art of canning sardines it is essential that each can which is filled with the sardines shall receive a definite and an equal amount of oil and that no oil be wasted or fed when there is no can to receive the oil, as it is the custom of manufacturers to allow a certain quantity of oil per thousand cans to be filled, in order to keep the cost of production uniform.

My invention consists in means for automatically carrying out the above desired results, said means comprising a table or platform over which is adapted to be fed the can bodies filled with the fish by means of a conveyer, a measuring and feeding disk provided with a plurality of holes or recesses each hole or recess being adapted to receive a definite amount of oil from a supply pipe, said disk being rotatable within a casing and the recesses or holes or compartments therein being adapted to register with an outlet hole over the path of the can bodies as they are fed by the conveyer whereby the oil is dropped or allowed to flow into the can bodies and mechanism for rotating the measuring and feeding disk, said mechanism being so devised as to rotate the disk only when a can body is presented under the oil feeding mechanism.

My invention furthermore consists in improvements in the parts and devices and the combinations of parts and devices as herein described, shown and claimed.

Figure 1:
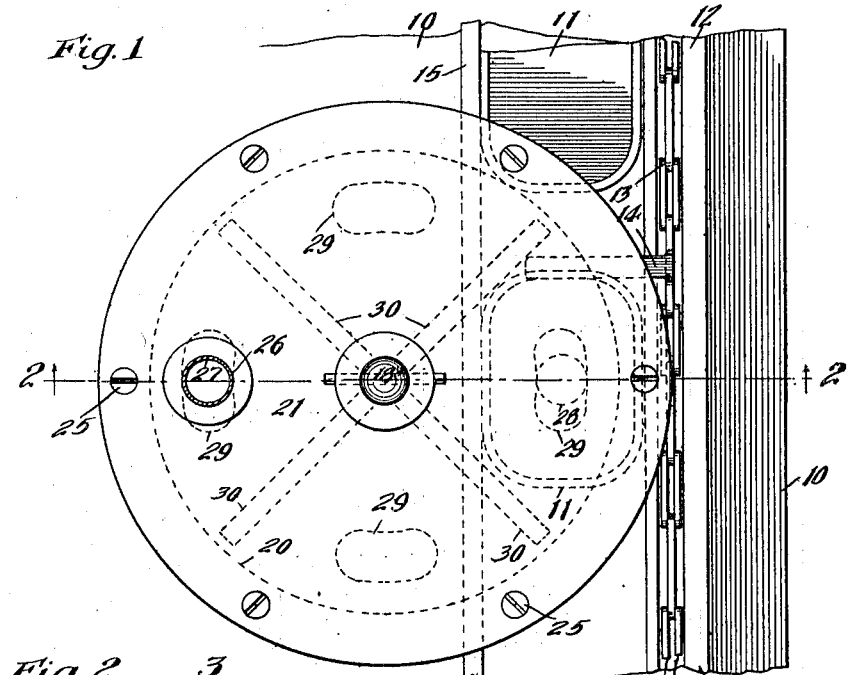
Figure 2:
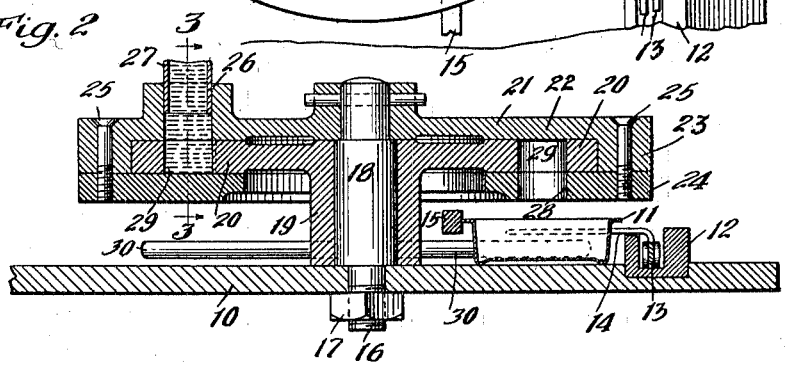
Figure 3:
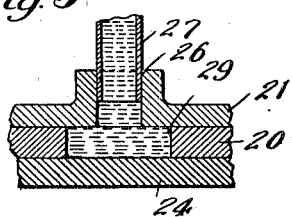

In the drawing forming a part of this specification, Figure 1 is a plan view of my improved oil measuring and feeding mechanism, portions of the table and conveyer being cut away. Fig. 2 is a vertical section taken substantially on the line 2—2 of Fig. 1 looking in the direction of the arrows, and Fig. 3 is a vertical detail section taken on the line 3—3 of Fig. 2 looking in the direction of the arrows.

In the drawing 10 represents any suitable bed or table upon which the can bodies 11 are adapted to be fed. Mounted on the table 10 is an endless conveyer guiding bar 12 in which is adapted to run any suitable conveyer 13 having spaced fingers 14 thereon adapted to feed the can bodies along the table between the bar 12 and a suitable guiding bar 15. This conveyer 13 may be operated either intermittently or continuously but preferably the same is moved intermittently.

Fixedly attached to the table 10, preferably by means of a screw 16 and a nut 17, is a short shaft 18 having rotatably mounted thereon a hub 19, said hub being provided with a disk or plate 20 preferably integrally formed therewith. Keyed or pinned to the shaft 18 is a casing 21 preferably consisting of an upper portion 22 having a depending circular flange 23 and an annular ring or plate 24 attached to the plate 22 by means of any suitable fastening devices such as the screws 25. The disk member 20 is adapted to slidably fit and rotate within the two members 22 and 24 said fit being such that the leaking of a liquid between the joint is prevented. In the upper member 22 is an inlet or supply opening 26 connected to any suitable supply tank (not shown) as by means of a pipe 27. The lower plate or ring 24 is also provided with a hole or outlet 28 at a point preferably diametrically disposed relatively to the inlet hole 26, said hole 28 being disposed above and in line with the line of travel of the can bodies as they are fed by the endless conveyer.

The rotatable disk 20 is preferably provided with a plurality of openings 29 each adapted to register with the inlet or supply opening 26 and the outlet opening 28, each of these openings or measuring pockets or compartments being preferably elongated circumferentially of the disk 20 to insure sufficient time for allowing the oil to be fed thereunto during the rotation of the disk.

In order to rotate the disk 20 and to rotate the same only when a can body is beneath the opening I provide a spider or similar construction integrally or rigidly formed with the hub 19, said spider consisting of a plurality of arms 30 corresponding in number to the number of openings 29 in the measuring disk 20 and these arms 30 are located in a plane slightly below the plane in which the fingers 14 travel, to thereby prevent disk 20 from being rotated when there is no can body present in front of the fingers 14.

As the can bodies are fed forward between the tracks 12 and 15 it will be evident that they will engage the arms or fingers 30 and rotate the disk 20, and that one of the openings 29 will register with the outlet opening 28 and allow the oil to drop into the cans and that also another opening 29 will register with the inlet hole 26 and receive its supply of oil. By the construction which I have shown I do away with all cams and complicated operating mechanism for rotating the measuring disk and it will be apparent that any suitable means may be used for operating the endless conveyer 14.

Various changes and modifications may be made in the details of the construction without departing from the spirit of the invention, and all such changes and modifications are contemplated as come within the scope of the claims appended hereto.

I claim:—

1. A can filling machine comprising, in combination: a measuring and filling mechanism; a vertically extending actuating shaft for said mechanism and having a star wheel thereon; a conveyer having a path of travel below the filling mechanism; a table adapted to support the cans as the same are being moved by the conveyer and at such a level that the cans will engage and operate the star wheel, said mechanism being also supported by said table, substantially as specified.

2. A can filling machine comprising, in combination: a casing having an integral circumferential flange and provided with an opening; a plate detachably secured to said casing and having also an opening out of alinement with said first named opening; a measuring disk rotatable between and engaging the inner surface of both said casing and said plate and having a plurality of openings therein adapted to aline successively with each of said openings in the casing and plate; an actuating shaft for said measuring disk; means for conveying cans beneath one of said openings; and means for operating said actuating shaft, substantially as specified.

WILLIAM E. TAYLOR.

Witnesses:
WILLIAM J. WILSON,
ETHEL E. FERSON.